UNITED STATES PATENT OFFICE.

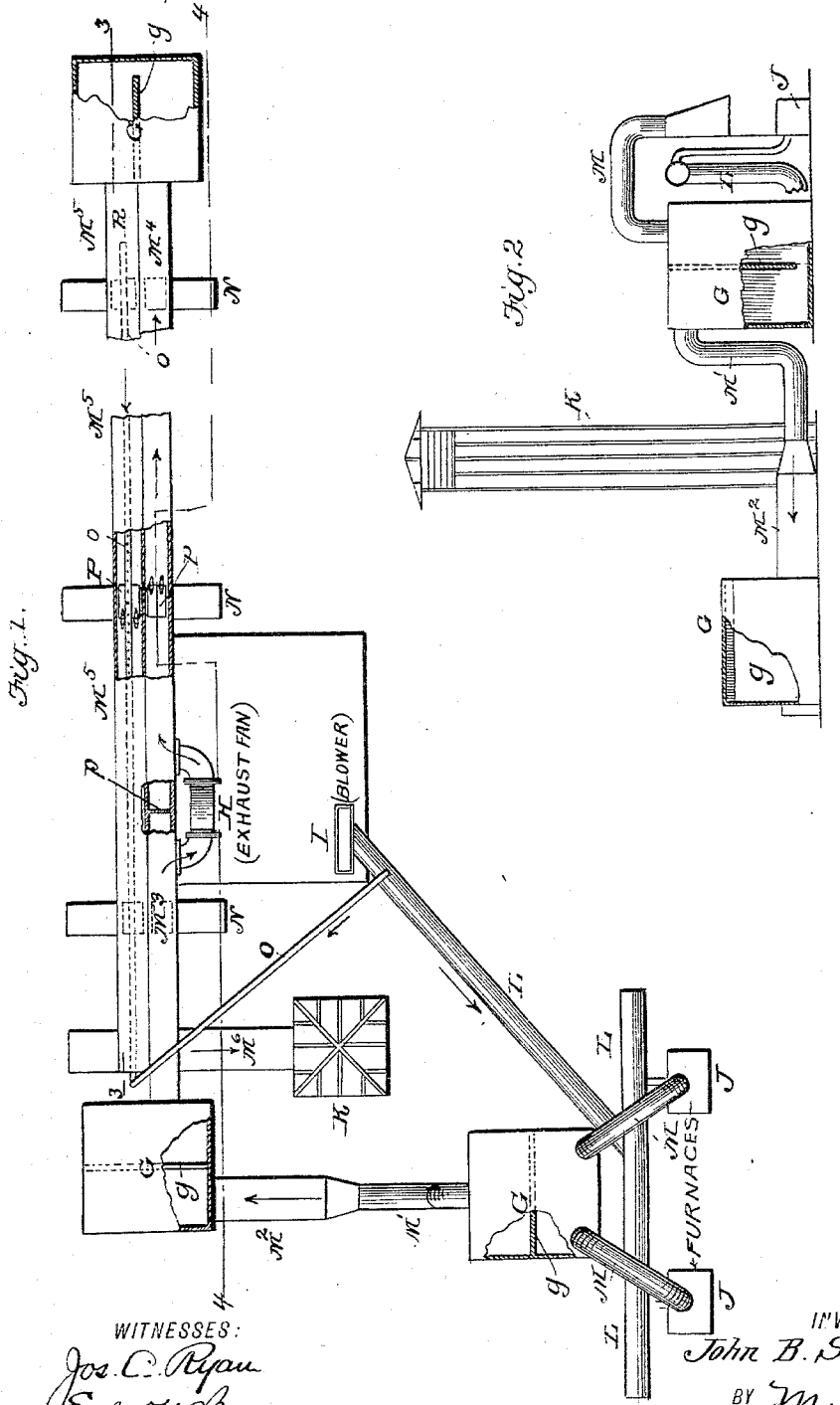

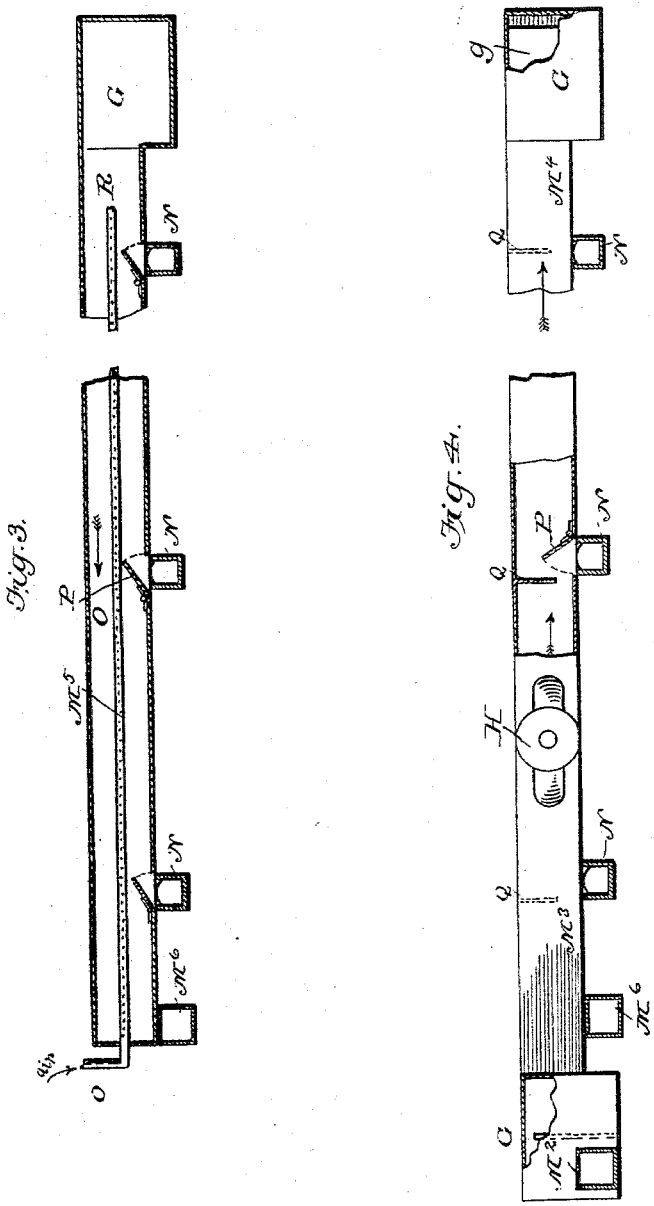

JOHN B. SERGEANT, OF JOPLIN, MISSOURI, ASSIGNOR TO WALTER SERGEANT, OF SAME PLACE.

APPARATUS FOR CATCHING WASTE PRODUCTS FROM LEAD-SMELTERS.

SPECIFICATION forming part of Letters Patent No. 597,660, dated January 18, 1898.

Application filed April 13, 1897. Serial No. 632,031. (No model.)

*To all whom it may concern:*

Be it known that I, JOHN B. SERGEANT, a citizen of the United States, residing at Joplin, in the county of Jasper and State of Missouri, have invented a new and useful Apparatus for Catching Waste Products from Lead-Smelters, of which the following is a specification.

The nature of my invention consists in a perforated pipe combined with and introduced into a special form of trail or conduit leading from a lead-smeltery to the smoke-stack, by which perforated pipe a spray of cold air is introduced into the gaseous current through the trail for the purpose of cooling the gaseous products of the smeltery and causing the same to settle and precipitate, as hereinafter more fully described.

In the accompanying drawings, Figure 1 is a ground plan of the smeltery, partly in section. Fig. 2 is an end elevation of the left-hand end of Fig. 1, with parts in section. Fig. 3 is a vertical longitudinal section through line 3 3 of Fig. 1. Fig. 4 is a partial vertical section through line 4 4 of Fig. 1.

G G G are settling-basins having baffle-plates $g$ within them to make a winding course for the smoke and gases.

H is an exhaust-fan for the purpose of drawing the fumes and waste products of the smeltery from pipes $M'$ $M^2$ $M^3$ and forcing them through the trail $M^4$ to $M^6$.

I is a blower which furnishes a blast for the smeltery and fresh air for the spray-pipe.

J J are furnaces.

K is the smoke-stack.

L are air-pipes from blower I to furnaces J.

M $M'$ $M^2$ $M^3$ $M^4$ $M^5$ $M^6$ are sections of the conduit-pipe which carries the fumes and waste products from the furnaces J to stack K, the current passing in the direction of the arrows. The pipes $M^3$, $M^4$, and $M^5$ are parallel and juxtaposed.

N N N are traps for collecting and withdrawing the settled products from the conduit-pipe.

O is a perforated pipe leading from blower-pipe L into the section $M^5$ of the conduit-pipe to throw air into the fumes traveling from the furnace to the stack.

P P P P are trap-doors leading from the conduit-pipe down into the traps N and placed at an angle with the draft, so as to catch and throw the condensed products passing through the conduit-pipe down into the traps N.

Q are deflectors in front of the trap-doors and extending from the top of the pipes $M^3$ and $M^4$ down about two-thirds of the height of the pipes, and are for the purpose of directing downwardly the draft, thereby causing the fumes to settle.

Between the pipe-sections $M^3$ and $M^4$ is placed a partition $p$, and the inlet to blower H communicates with pipe $M^3$ on one side of the partition, and the outlet with pipe $M^4$ on the other side of the partition. This blower is to energize and quicken the current in the conduit-pipe or trail.

To enable others skilled in the art to make use of my invention, I will proceed to describe its construction and operation.

The lead ore is smelted in the furnaces J J in the ordinary manner, the blast being supplied by the blower I. The furnaces are hooded in such a manner as to throw all of the fumes, smoke, and waste products into the pipes M, from which they pass into the first settling-basin G. From there they pass through pipes $M'$ $M^2$ to a second settling-basin G, thence through pipe $M^3$ to the exhaust-fan H. From there they pass along the pipe $M^4$, coming in contact with the doors P P, whereby a portion of the condensed products is thrown into the traps N and a part into the third basin G. When the vapors, fumes, and waste products reach the point R, they come in contact with and are mixed with a spray of fresh air discharged from the perforated pipe O. This introduction of the fresh air cools the fumes and waste products from the smeltery, thereby causing all the metallic substances to be condensed, thrown down, and precipitated, allowing the gases to escape through pipes $M^5$ $M^6$ into the stack K, and thence to the outer air.

I am aware that it is not broadly new to condense metallic fumes by the introduction into such currents of other currents of cold air, and I do not claim this broadly.

Having thus described my invention, what I claim as new, and desire to secure by Letters Patent, is—

1. The combination with a smelting-furnace, and its trail, and stack, of the pipes $M^3$ $M^4$ with partition $p$, exhaust-fan H, and traps N with inclined covers P and deflectors Q, the parallel pipe $M^5$, pipes $M^4$ and $M^5$ being at their ends connected by a settling-basin, a blower for the furnaces, and a pipe leading from the blower to the pipe $M^5$, and having a perforated extension through the pipe $M^5$ to introduce jets of cold air substantially as and for the purpose described.

2. The combination of the smelting-furnace J, and pipes M, and the blower I and pipe L, the three settling-basins G G G with baffle-plate $g$, the trail-sections $M'$ $M^2$ $M^3$ $M^4$ $M^5$ $M^6$, the sections $M^3$ and $M^4$ being separated by partition $p$ and provided with suction-fan H and having also the traps N with inclined covers P and deflectors Q, and the section $M^5$ being parallel and juxtaposed to $M^3$ $M^4$ and having within it a perforated pipe O connected to the blower substantially as and for the purpose described.

JOHN B. SERGEANT.

Witnesses:
CLARK CLAYCROFT,
W. T. CRANE.